(No Model.)
A. D. POST.
OYSTER DREDGE.
No. 521,918. Patented June 26, 1894.
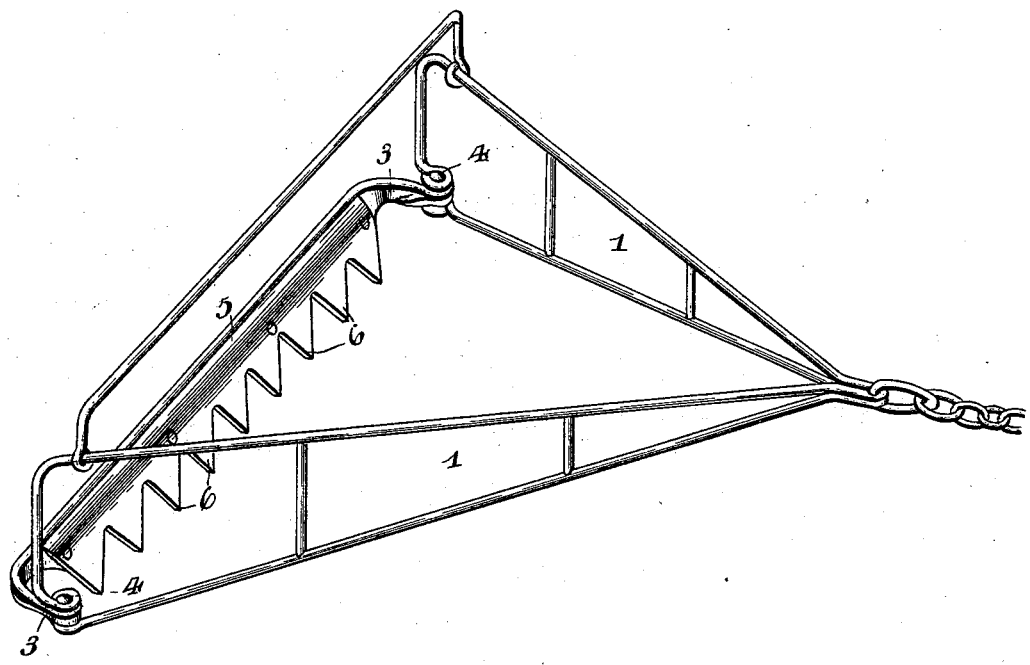
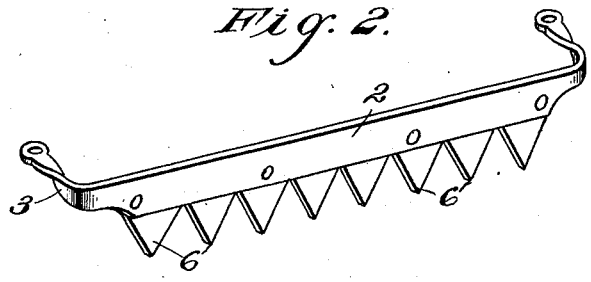
Witnesses
C. A. Ford.
W. S. Duvall.
Inventor
Andrew D. Post,
By his Attorneys.
C. A. Snow & Co.

UNITED STATES PATENT OFFICE.

ANDREW DECKER POST, OF KEYPORT, NEW JERSEY, ASSIGNOR OF ONE-HALF TO GARRET E. POST, OF SAME PLACE.

OYSTER-DREDGE.

SPECIFICATION forming part of Letters Patent No. 521,918, dated June 26, 1894.

Application filed July 7, 1893. Serial No. 479,829. (No model.)

*To all whom it may concern:*

Be it known that I, ANDREW DECKER POST, a citizen of the United States, residing at Keyport, in the county of Monmouth and State of New Jersey, have invented a new and useful Oyster-Dredge, of which the following is a specification.

My invention relates to improvements in oyster-dredges, and has particular reference to improvements upon the teeth thereof.

Heretofore it has been customary to form the teeth integral with the cross-bar of the frame, so that if perchance a tooth should break, which is often the case, it necessitated going ashore and carrying the dredge to the nearest blacksmith for repairs.

The objects of my present invention are to avoid this disadvantage and delay, and to so construct the tooth or rake that it may be repaired on board ship by means of the ordinary tools usually at hand.

With these objects in view the invention consists in certain features of construction hereinafter specified and particularly pointed out in the claim.

Referring to the drawings:—Figure 1 is a perspective view of a dredge embodying my invention. Fig. 2 is a detail of the rake.

Like numerals of reference indicate like parts in both the figures of the drawings.

The dredge frame is of the ordinary construction, consisting of the opposite open sides 1, the same having connected at one of their lower corners the transverse cross-bars 2, whose terminals 3 are forwardly bent and secured by bolts 4 in position upon the frame.

The rake or head 5 comprises a series of teeth 6 formed integral therewith, and said rake is by means of rivets, bolts, or other similar securing devices, fastened in position upon the cross-bar. The rake is preferably formed by stamping the same out of sheet-metal.

An oyster-dredge provided with a rake constructed in accordance with my invention I have found by experience will operate more sharply upon the oyster-bed and facilitate the gathering of oysters; and, furthermore, will not clog as those do which have come under our observation.

If at any time a break should occur it will be a simple matter to punch out the rivets or remove the bolts that secure the rake bar to the cross-bar and substitute a new rake bar, riveting it in position very readily by the tools usually at hand on board the boat.

Having described my invention, what I claim is—

The herein described oyster-dredge, the same consisting of the opposite triangular frames, the upper transverse connecting-bar, and the lower transverse connecting-bar at the outer divergent ends of said frames, and the independent toothed rake-bar riveted to the aforesaid lower transverse connecting-bar, substantially as specified.

In testimony that I claim the foregoing as my own I have hereto affixed my signature in the presence of two witnesses.

ANDREW DECKER POST.

Witnesses:
  JOSEPH STATT,
  MARCUS B. TAYLOR.